United States Patent
Blank et al.

(10) Patent No.: US 8,026,015 B2
(45) Date of Patent: Sep. 27, 2011

(54) MEMBRANE ELECTRODE ASSEMBLY FOR A FUEL CELL

(75) Inventors: Felix Blank, Constance (DE); Verena Graf, Blaustein (DE); Cosmas Heller, Friedrichshafen (DE); Martin Quintus, Goeppingen (DE); Regina Wezel, Ulm (DE)

(73) Assignee: Daimler AG, Stuttgart (DE)

(*) Notice: Subject to any disclaimer, the term of this patent is extended or adjusted under 35 U.S.C. 154(b) by 1306 days.

(21) Appl. No.: 10/933,554

(22) Filed: Sep. 3, 2004

(65) Prior Publication Data

US 2005/0053817 A1    Mar. 10, 2005

(30) Foreign Application Priority Data

Sep. 4, 2003    (DE) .................... 103 40 834

(51) Int. Cl.
*H01M 8/10*    (2006.01)
*H01M 8/00*    (2006.01)

(52) U.S. Cl. ......... 429/481; 429/400; 429/479; 429/480

(58) Field of Classification Search .................. None
See application file for complete search history.

(56) References Cited

U.S. PATENT DOCUMENTS

| | | | |
|---|---|---|---|
| 5,620,807 A | 4/1997 | Mussell et al. | 429/33 |
| 6,350,539 B1 | 2/2002 | Wood, III et al. | 429/34 |
| 6,416,898 B1 | 7/2002 | Ohzu et al. | |
| 6,977,234 B2 * | 12/2005 | Kosako et al. | 502/101 |
| 2002/0015875 A1 * | 2/2002 | Kim | 429/33 |
| 2002/0058180 A1 * | 5/2002 | Beattie et al. | 429/44 |
| 2002/0192530 A1 * | 12/2002 | Kabumoto et al. | 429/38 |
| 2003/0059658 A1 | 3/2003 | Kohler et al. | 429/30 |
| 2003/0104267 A1 | 6/2003 | Haridoss et al. | 429/44 |
| 2004/0001993 A1 * | 1/2004 | Kinkelaar et al. | 429/40 |
| 2005/0019639 A1 | 1/2005 | Nakakubo et al. | |

FOREIGN PATENT DOCUMENTS

| | | |
|---|---|---|
| DE | 199 83 182 | 5/2001 |
| DE | 199 83 182 T1 | 6/2001 |
| DE | 100 52 189 | 5/2002 |
| DE | 102 60 501 | 7/2004 |
| EP | 0 292 431 | 11/1988 |
| EP | 1 176 654 | 1/2002 |
| EP | 1 261 057 | 11/2002 |
| EP | 1 336 999 | 8/2003 |
| JP | 7-229171 A | 8/1995 |
| JP | 2000-208152 A | 7/2000 |
| JP | 2002-289230 A | 7/2000 |
| JP | 2000-285933 A | 10/2000 |

(Continued)

OTHER PUBLICATIONS

Online translation of JP 2001-243959, Koyashiki et al., Sep. 7, 2001.*

Martin Woehr, Wolfgang Neubrand, Dynamische Simulation einer Polymer-Membran-Brennstoffzelle (PEFC), Chemie Ingenieur Technik (68) 7/96, pp. 842-845.

(Continued)

*Primary Examiner* — Barbara Gilliam
*Assistant Examiner* — Kwang Han
(74) *Attorney, Agent, or Firm* — Davidson, Davidson & Kappel, LLC

(57) ABSTRACT

A membrane electrode assembly for a fuel cell having a polymer electrolyte membrane, having a layer sequence comprising an ion-conducting membrane (2), a catalyst layer (3) and a gas diffusion layer (5). A substantially catalyst-free, porous condensation layer (5) is arranged between the catalyst layer (3) and the membrane (2).

10 Claims, 2 Drawing Sheets

| | FOREIGN PATENT DOCUMENTS | | |
|---|---|---|---|
| JP | 2003-288915 A | 10/2003 | |
| JP | 2004-186041 A | 7/2004 | |
| WO | WO 99/56335 | 11/1999 | |
| WO | WO 00/55933 | 9/2000 | |
| WO | 01 45191 | 6/2001 | |
| WO | WO/02/058178 | * | 7/2002 |
| WO | WO 03/058741 A1 | 7/2003 | |

OTHER PUBLICATIONS

Martin Woehr, Instationaeres, thermodynamisches Verhalten der Polymermembranbrennstoffzelle, Fortschritt-Berichte VDI, Reihe 3 Verfahrenstechnik, Nr. 630, ISBN 3-18-363003-6.

* cited by examiner

MEMBRANE ELECTRODE ASSEMBLY FOR A FUEL CELL

This claims the benefit of German Patent Application No. 103 40 834.7, filed Sep. 4, 2003 and hereby incorporated by reference herein.

BACKGROUND

The present invention relates to a membrane electrode assembly for a fuel cell.

It is known that the water budget is a critical factor in fuel cells with a polymer electrolyte membrane. A proton-conducting membrane and a catalyst layer on both sides are provided in the interior of the fuel cell. The catalyst layer, which is required for the electrochemical reaction, has a porous structure comprising agglomerates with characteristic pore radii of a few nanometers to a few hundred nanometres. A porous gas diffusion layer, generally comprising a plurality of individual layers with pores of significantly larger radii, through which starting materials, usually hydrogen and oxygen, are transported from an anode duct and a cathode duct and products (water) are discharged to the duct, is usually arranged on the catalyst layers on both sides of the membrane. Gas mixtures comprising a certain level of water vapor are usually present in the cathode duct. Further water vapor is fed to the duct from the catalyst layer through diffusion. Consequently, it can be assumed that the level of water vapor in the catalyst layer is significantly higher than in the porous gas diffusion layer and in the duct.

If the level of water vapor in the duct is very low, despite the increase in the level of water vapor towards the catalyst, there will be insufficient water vapor there to protect the adjoining membrane and the catalyst layer itself from drying out. If the level of water vapor in the duct is low, water is extracted initially from the catalyst layer and ultimately from the membrane through diffusion across the porous gas diffusion layer, which can cause damage to the membrane.

On the other hand, if the level of water vapor in the duct is very high, it will increase towards the catalyst layer to such an extent that the condensation point is reached and liquid water will be formed in the pores in the catalyst layer. The flooding with liquid water which then results is a crucial factor in preventing the supply of starting materials to the catalyst layer and also significantly inhibits the fuel cell reaction on account of the difficulties involved in discharging liquid water. Although there is then no risk of the membrane drying out, the efficiency and operational reliability of the fuel cell are greatly reduced.

German Patent Application No. DE 100 52 189 A1 discloses providing a buffer layer in a gas diffusion electrode for the purpose of controlling the gas and water management. In this case, a hydrophobic buffer layer is arranged between a carbon paper and a catalyst layer, the intention being to improve distribution of gas and water.

BRIEF SUMMARY OF THE INVENTION

The present invention is based on an object of providing a membrane electrode assembly for a fuel cell which allows the water budget of the fuel cell to be further improved.

The membrane electrode assembly according to the present invention for a fuel cell having a layer sequence comprising a membrane, a catalyst layer and a gas diffusion layer has a substantially catalyst-free, porous condensation layer between the catalyst layer and the membrane.

It is preferable for the layer sequence to be symmetrical with respect to the membrane for an anode side and a cathode side of the fuel cell. The condensation layer can cause water to condense in the pores, so that the membrane and the catalyst layer are supplied with water. The membrane is reliably prevented from drying out. Moreover, given an approximately equal reaction intensity, it is possible to significantly reduce the levels of catalytically active material, in particular platinum, in the catalyst. The condensation of water vapor, in particular capillary condensation, can take place at lower relative humidities than in the catalyst layer. This increases a vapor pressure difference between a water-producing catalyst in the catalyst layer and the condensation layer, with water vapor transfer being caused by means of diffusion across the very short distance between the catalyst and condensation layer. This flow of water vapor then supplies the condensation layer with further moisture should the condensation layer release water to the membrane and pores in the condensation layer empty out. If the supply of moisture is excessive, it is easy to prevent excessive flooding of the catalyst and/or membrane with water by reducing the humidification of the fuel cell and/or operating the fuel cell at a higher temperature, which is highly advantageous for use in a vehicle, and/or increasing any hydrophobizing of the catalyst layer and/or increasing pore radii of the catalyst layer and/or the gas diffusion layer. The result of all these measures is that the relative humidity in the catalyst layer drops and there is a clear separation between a moist but not wet catalyst layer and a constantly wet condensation layer which is able to supply the membrane with water on an ongoing basis. The pores in the condensation layer may be expediently in the range from 0.5 to 150 nm, preferably 1 to 100 nm.

If the condensation layer is designed to be ion-conducting at least in regions, ion transfer from the catalyst layer to the membrane and vice versa can take place, so that the ion-conducting function of the membrane is continued in the condensation layer as far as the catalyst layer.

If the condensation layer is designed to be hydrophilic at least in regions, it is possible to ensure that reaction water and/or moisture introduced with an oxidizing agent and/or reducing agent preferably passes into the condensation layer. It is expedient to render the gas diffusion layer and the catalyst layer hydrophobic, with the degree of hydrophobicity expediently increasing from the gas diffusion layer to the catalyst layer. This boosts the effect of the condensation layer.

The thickness of the condensation layer is preferably in the range from 3 to 20 μm, in particular in the range from 5 to 10 μm.

If pores in the condensation layer are covered on their inner surfaces with a coating of an ion-conducting material, it is possible to ensure that the pores remain open for transporting water through the condensation layer and that the transportation properties of the membrane electrode assembly are not adversely affected.

If the coating includes a perfluorosulphonic acid polymer, the present invention provides a particularly suitable material which is customarily also present in membranes.

If the coating includes an ion-conducting material which corresponds to an ion-conducting material of the membrane, the result is a favorable interaction of membrane and condensation layer.

The coating may optionally include methyl cellulose as an inexpensive alternative to a perfluorosulphonic acid polymer.

If the condensation layer has a smaller mean pore density than the catalyst layer, it is possible to ensure that there is no capillary condensation in the catalyst layer. The structure of the condensation layer may preferably resemble that of a standard catalyst layer, with the mean pore diameter of the condensation layer being smaller and with no catalyst or hydrophobic additives being provided. The condensation layer may, for example, consist of carbon with an aliphatic perfluorosulphonic acid polymer, e.g. NAFION, incorporated in the pores.

If the condensation layer has a mean pore diameter which is sufficient for capillary condensation, water vapor can be condensed even at relatively low humidity levels. It is expedient for pores in the gas diffusion layer and in the catalyst layer to be of a size which eliminates capillary condensation there. Furthermore, the condensation layer ensures that pores at a relatively great depth of the catalyst layer in which oxygen has already been depleted, for example, on the cathode side and the levels of water vapor have increased towards the membrane, do not become blocked by water condensing to an increasing extent therein, such that they can in fact no longer participate in the reaction. The result of this is that the thickness of the catalyst layer can be greatly reduced by the condensation layer.

If the condensation layer is designed to be more hydrophilic than the catalyst layer, it is possible to ensure that water avoids the catalyst layer and collects in the condensation layer. Flooding of the catalyst layer is avoided.

BRIEF DESCRIPTION OF THE DRAWINGS

Expedient configurations and advantages of the invention are given in the description and the further claims.

The following text provides a more detailed explanation of the invention on the basis of an exemplary embodiment described in the drawing, in which.

DETAILED DESCRIPTION

Figure 1:
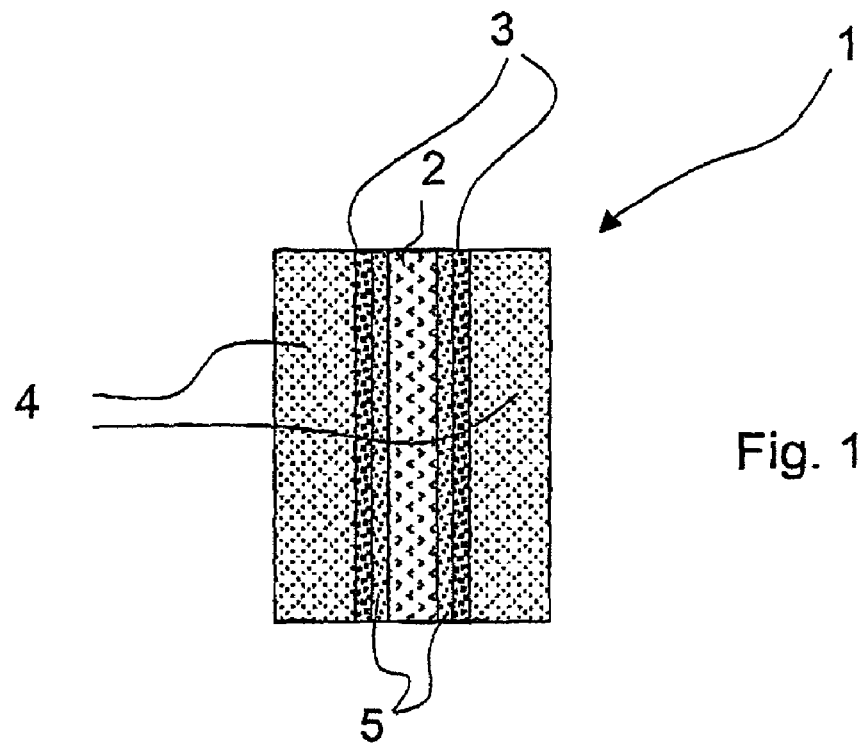
FIG. 1 shows a section through a diagrammatically depicted membrane electrode assembly of a fuel cell in accordance with the invention.

A membrane electrode assembly 1 for a fuel cell having a layer sequence comprising an ion-conducting membrane 2, in particular a polymer electrolyte membrane, a catalyst layer 3 and a gas diffusion layer 4 is shown in FIG. 1. The layer sequence is illustrated for an anode side and a cathode side of the membrane, with the reducing agent, such as for example hydrogen, being fed to the anode side and the oxidizing agent, such as for example atmospheric oxygen, being fed to the cathode side. Further standard details of the fuel cell, such as adjacent fuel cells, bipolar plates, fuel cell stacks, media feeds and the like, or details of a fuel cell system, will be fully familiar to the person skilled in the art. The layer thicknesses and materials for the catalyst layer 3, gas diffusion layer 4 and membrane 2 preferably correspond to what is known and standard, for example from the cited prior art.

A substantially catalyst-free, porous condensation layer 5 is arranged between the catalyst layer 3 and the membrane 2. It is preferable for the layer thickness of the condensation layer 5 to correspond to that of the catalyst layer 3. The condensation layer 5 is particularly preferably designed to be hydrophilic.

Figure 2:
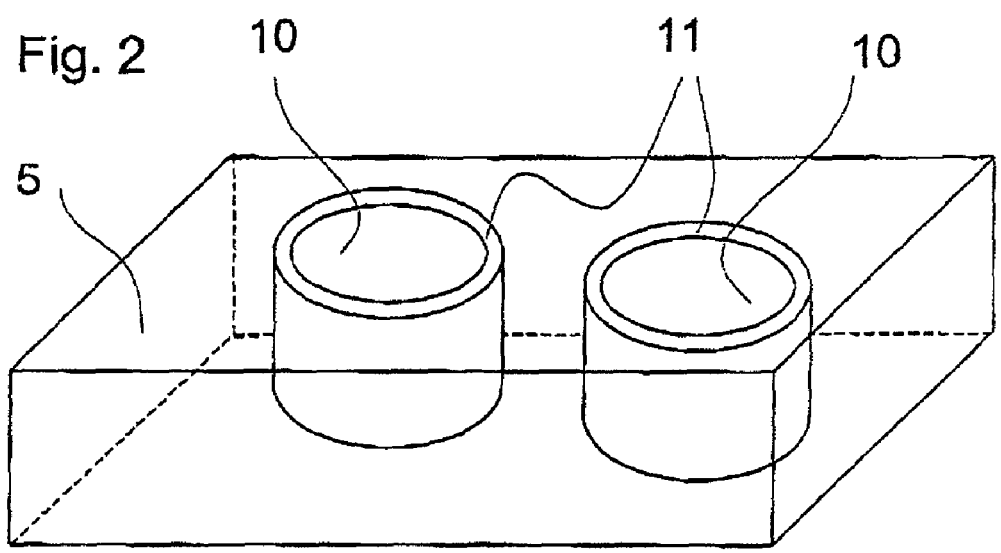
FIG. 2 shows a detail of a condensation layer with pores.

FIG. 2 diagrammatically depicts a detail of the condensation layer 5. The base structure of the condensation layer 5 may substantially resemble that of the catalyst layer 3. A standard catalyst layer 3 consists, for example, of base carbon particles which are covered with platinum as catalytic material and hydrophobized with TEFLON. The condensation layer 5, by contrast, is catalyst-free and is also free of TEFLON and in particular is configured so as to be hydrophilic. The pores 10 in the condensation layer 5 are covered on their inner surfaces with a coating 11 of an ion-conducting material, with the pores 10 remaining permeable. The coating 11 may consist of an aliphatic perfluorosulphonic acid polymer, for example NAFION 117, or of sulphonated PEEKK, a polyether ketone with aromatic polymer backbone, of methyl cellulose or of another suitable ion-conducting material. It is preferable to use the same ion-conducting material for the coating 11 as for the membrane 2. The mean pore diameter of a plurality of pores 10 in the condensation layer 5 is sufficiently small for capillary condensation.

The layer sequences of the membrane electrode assembly 1 can be produced substantially in the same way as in the cited prior art.

Figure 3:
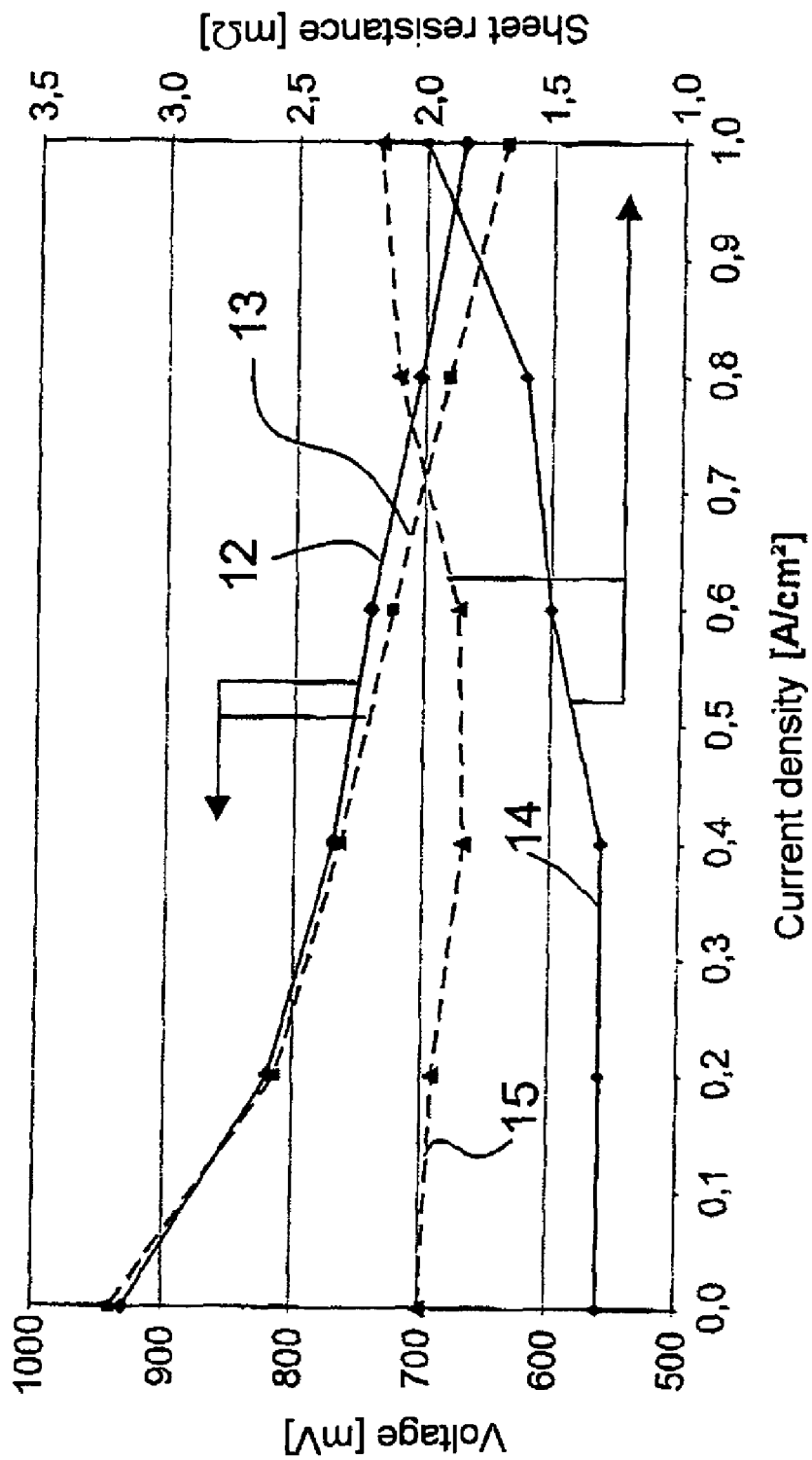
FIG. 3 shows a current-voltage curve and a surface resistivity curve plotted against the current density of a standard membrane electrode assembly and a membrane electrode assembly according to the invention for comparison purposes.

FIG. 3 shows measurement results carried out on a fuel cell stack at an operating temperature of 90° C. using standard fuel cells (curves 13, 15) and using fuel cells having the membrane electrode assembly of the present invention (curves 12, 14). The curve showing the cell voltage against the current density decreases, as is customary with fuel cells, as the current density increases. However, the decrease in the cell voltage is lower for the curve 12 representing the membrane electrode assembly 1 according to the present invention than for the curve 13 of the conventional arrangement without condensation layer 5. The surface resistivity also reveals an improvement: curve 14 reveals a significantly lower surface resistivity in the fuel cells having the arrangement of the present invention than curve 15 for conventional fuel cells.

| REFERENCE NUMERALS | |
|---|---|
| 1 | Membrane electrode assembly |
| 2 | Membrane |
| 3 | Catalyst layer |
| 4 | Gas diffusion layer |
| 5 | Condensation layer |
| 10 | Pore |
| 11 | Coating |
| 12 | Curve |
| 13 | Curve |
| 14 | Curve |
| 15 | Curve |

What is claimed is:

1. A membrane electrode assembly for a fuel cell having a polymer electrolyte membrane, comprising:
a layer sequence having an ion-conducting membrane, a catalyst layer, a gas diffusion layer, and a substantially catalyst-free, porous condensation layer between the catalyst layer and the membrane, wherein the condensation layer is hydrophilic.

2. The membrane electrode assembly as recited in claim 1 wherein the condensation layer is ion-conducting at least in some regions.

3. The membrane electrode assembly as recited in claim 1 wherein the condensation layer has pores, the pores being provided on their inner surfaces with a coating of an ion-conducting material.

4. The membrane electrode assembly as recited in claim 3 wherein the coating includes a perfluorosulphonic acid polymer.

5. The membrane electrode assembly as recited in claim 3 wherein the coating includes an ion-conducting material corresponding to a membrane ion-conducting material of the membrane.

6. The membrane electrode assembly as recited in claim 3 wherein the coating includes methylcellulose.

7. The membrane electrode assembly as recited in claim 1 wherein the condensation layer has a smaller mean pore diameter than the catalyst layer.

8. The membrane electrode assembly as recited in claim 1 wherein the condensation layer has a mean pore diameter sufficient for capillary condensation.

9. The membrane electrode assembly as recited in claim 1 wherein the condensation layer is more hydrophilic than the catalyst layer.

10. The membrane electrode assembly as recited in claim 1 wherein the gas diffusion layer is hydrophobic.

* * * * *